UNITED STATES PATENT OFFICE.

ROBERT B. WILLIAMSON, OF NORWOOD, OHIO, ASSIGNOR, BY MESNE ASSIGNMENTS, TO ALLIS-CHALMERS MANUFACTURING COMPANY, A CORPORATION OF DELAWARE.

AUTOMATIC CONTROL OF MOTORS.

1,115,360.      Specification of Letters Patent.      Patented Oct. 27, 1914.

Application filed November 3, 1906. Serial No. 341,909.

*To all whom it may concern:*

Be it known that I, ROBERT B. WILLIAMSON, a citizen of the United States, residing at Norwood, in the county of Hamilton and State of Ohio, have invented certain new and useful Improvements in Automatic Control of Motors, of which the following is a full, clear, and exact specification.

My invention relates to motor control systems, and particularly to automatic control systems for electric motors carrying a varying load.

When the load on an electric motor varies between wide limits, the motor must generally be of sufficient capacity to carry the greatest load. Moreover, the resultant wide fluctuations in current cause a corresponding varying demand for power on the generating equipment. Both of these things are objectionable.

It is the object of my present invention to provide a system in which the motor capacity can be considerably reduced below that necessary for the greatest load required to be driven, and to provide other means for carrying the temporary excesses in the load, thus equalizing the load actually carried by the motor and diminishing the current fluctuations in the system. To this end I provide means for storing up the excess of energy when the load on the motor is light and for drawing upon such stored up energy when the load on the motor is greater than that which it is designed to carry. In order to obtain this latter result from the storehouse of energy, which storehouse in the preferred form of my invention is a flywheel, the motor must be permitted to slow down so that the fly-wheel may give up its energy.

In addition to the other features my invention therefore comprises a novel means for automatically controlling the speed of an electric motor.

In a broad aspect my invention consists of the combination of an electric motor, a generator connected to run at a speed which varies inversely as that of the motor, and controlling means for the motor operated by current from said generator.

In a more specific aspect my invention consists of an induction motor, a generator the speed of which is proportional to the slip of said motor, and a resistance in the rotor circuit of the motor which is varied as the speed of the generator.

Many other features of my invention will appear from the description and drawings and will be particularly pointed out in the claims.

Figure 1:
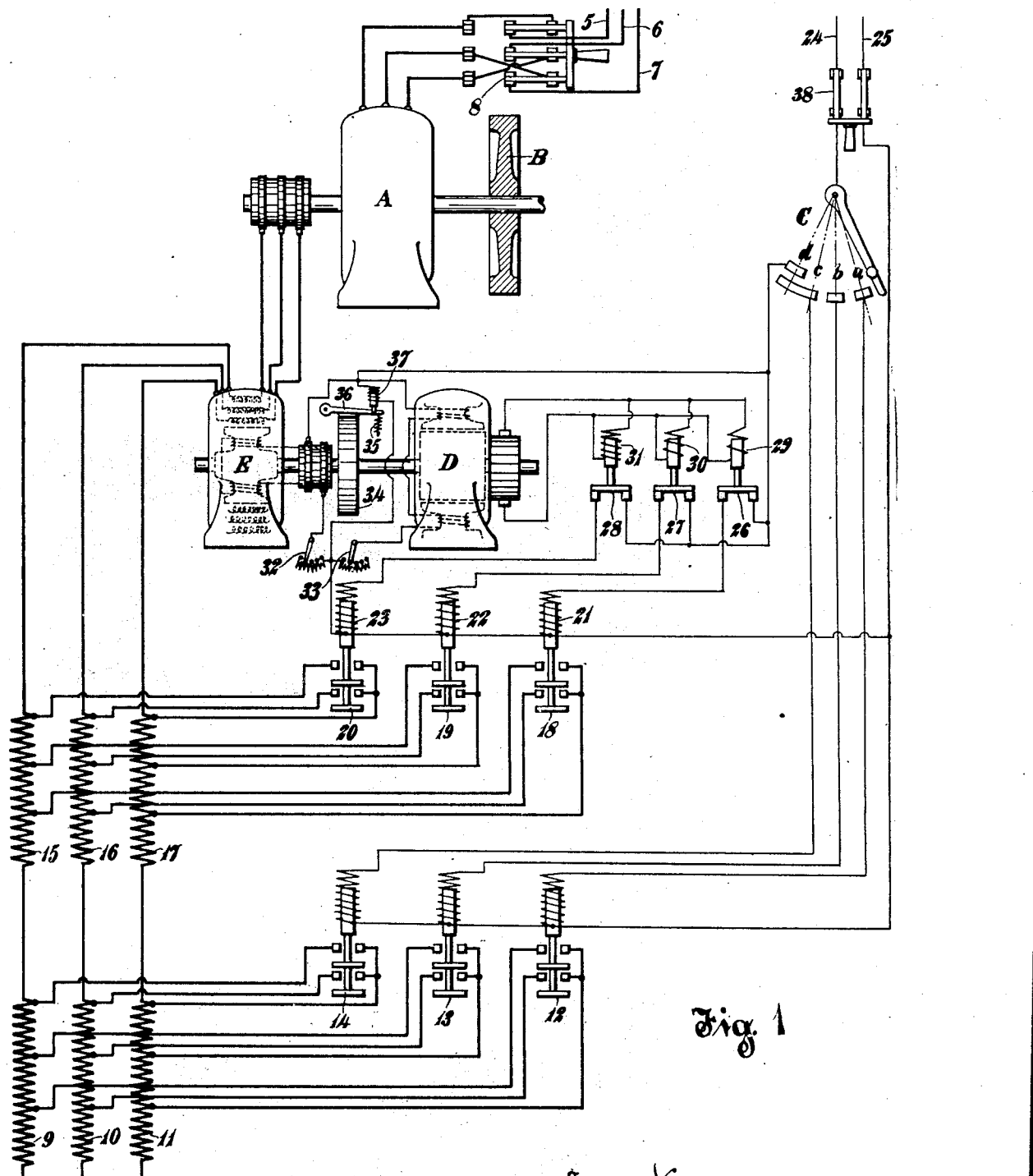
Figure 2:
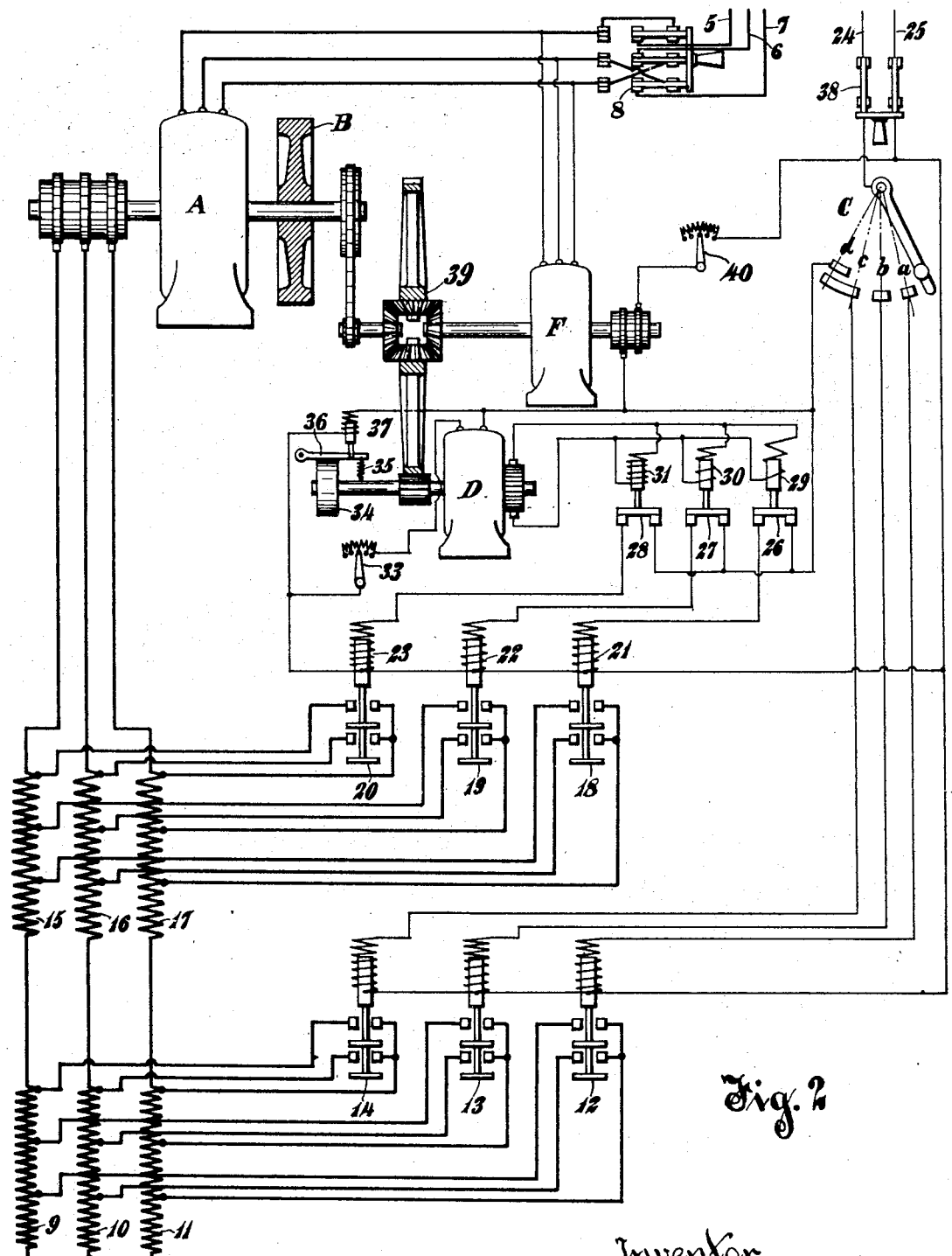

In the drawings Figures 1 and 2 represent diagrammatically two preferred embodiments of my invention.

In both of these figures, A is a motor which is to drive a variable load. This motor is here shown as a three-phase induction motor, though obviously my invention is not limited to this type of motor but is equally applicable to motors of other types. Mechanically connected to the rotating element of this motor, as by being mounted on the same shaft therewith, is a fly-wheel B. The motor A is supplied from any suitable three-phase source through the mains 5, 6 and 7 and the main switch 8, which in this case is shown as a double throw switch to permit reversal of the motor.

In the rotor circuit of the motor A is a starting resistance 9, 10 and 11, the three parts of this resistance in this instance being shown star connected. Other methods of connecting the resistance may be used, however, if desired. The starting resistance is arranged to be controlled by solenoid operated switches 12, 13 and 14, these switches being arranged so that each one when closed simultaneously short-circuits a similar portion of each part of the starting resistance 9, 10 and 11. Also connected in the rotor circuit and in series with the starting resistance 9, 10 and 11, is a regulating resistance 15, 16 and 17, which under certain conditions may be short-circuited in whole or in part by the solenoid operated switches 18, 19 and 20. Each of the switches 18, 19 and 20 when closed simultaneously short-circuits a corresponding portion of each part of the resistance 15, 16 and 17.

The solenoids 21, 22 and 23 of the switches 18, 19 and 20 respectively, as well as the solenoids for operating the switches 12, 13 and 14, are supplied with current from any desired source through the mains 24 and 25. The source which supplies the mains 24 and 25 is preferably a source of direct current. The solenoids of the switches 12, 13 and 14 are controlled by a master controller C so arranged that in its positions a, b and c it causes the solenoids of these switches to operate successively. In its running position d, the controller C, besides maintaining the solenoid of switch 14 energized, also completes certain other circuits which will be described hereinafter. Among these other circuits are those of the solenoids 21, 22 and 23, these latter circuits being also controlled by switches 26, 27 and 28 respectively. The switches 26, 27 and 28 are normally closed, and may be opened by solenoids 29, 30 and 31 respectively wound to respond to successively lower voltages. The solenoids 29, 30 and 31 are supplied by a generator D, preferably a direct current generator. The speed of this generator depends on the speed of the motor to be controlled, and in the arrangements illustrated is varied directly as the slip of the motor A or inversely as the speed of said motor.

In the two figures of the drawing, the desired variation in speed in the generator D is obtained in different ways, and therefore the remaining parts of the two figures will be described separately.

Referring now particularly to Fig. 1, the generator D is driven by a synchronous motor E. The motor E is the primary and the generator D the secondary of an electric converter. The three-phase alternating current winding of this motor is connected in the rotor circuit of the motor A so that the frequency of the currents in the winding depends on the slip of the motor A. The nearer the motor A approaches synchronous speed, the less will be the frequency of the currents in its rotor circuit, and the slower will the motor E rotate. The direct current winding of the motor E is supplied from the mains 24 and 25 when the master controller C is in position d. The field winding of the generator D is supplied from the same source at the same time. These last two windings may be regulated by means of the rheostats 32 and 33 respectively. A brake-wheel 34 is on the common shaft of the motor E and the generator D, and normally held in engagement with said wheel 34, as by a spring 35, is a brake 36. This brake is released by a solenoid 37 when the master controller C is in position d.

The operation of the system shown in Fig. 1 is as follows:

With the master controller C in off position as shown, the switch 8 in the main circuit and switch 38 in the main 24 and 25 are closed. All of the resistances 9, 10 and 11, and 15, 16 and 17 are now in the rotor circuit of the motor A. The motor A now starts. When the motor has gained sufficient speed the master controller C is moved into position a to cause the operation of switch 12 to short-circuit the lower sections of the starting resistances 9, 10 and 11. Upon further gains in speed, the controller is successively moved into positions b and c to cause the operation of the solenoids 13 and 14 to short-circuit the middle and upper sections of said starting resistance. If possible, during this starting the motor should carry no other load than that of accelerating the fly-wheel B. As the motor A gains in speed, the frequency of the currents in its secondary windings will decrease until it approaches zero. The synchronous motor E is held from rotation at this time by the brake 36 acting on the brake-wheel 34. When the motor A has attained nearly synchronous speed, the master controller C is moved into position d, to close the circuits of the solenoids 21, 22 and 23, the direct current winding of motor E, the field winding of generator D, and the solenoid 37. The brake 36 is now released, and, the frequency of the currents in the secondary circuit being comparatively small, the motor E begins to rotate and to drive the generator D at a low speed. This speed is generally insufficient at this time to energize any of the solenoids 29, 30 and 31 sufficiently to cause them to open their switches. The switches 26, 27 and 28 thus being closed, the solenoids 21, 22 and 23 are energized to close their switches 18, 19 and 20 to short-circuit the whole of the resistance 15, 16 and 17. The motor A is now at its maximum speed, and the fly-wheel B has a great amount of energy stored in it by its rotation. The motor may now run to drive its normal load and to maintain the store of energy in the fly-wheel B. If the load on the motor is increased, a slight slowing down of the motor results. This causes an increase in the slip of said motor, and therefore an increase in the frequency of the currents in the alternating current winding of motor E. The motor E therefore increases in speed and drives the generator D to generate a higher electromotive force. As the electromotive force of generator D rises, the solenoid 31 is first energized sufficiently to open the switch 28, thus deënergizing the solenoid 23 and allowing the switch 20 to open. This opens the short-circuit around the upper sections of the resistance 15, 16 and 17 and increases the resistance of the rotor winding of the induction motor A, causing the slip of said motor to be increased still further and the motor E to gain still more in speed. If sufficient, the resulting increase in the electromotive force of the generator D causes the solenoid 30 to open its switch 27, thus deënergizing the solenoid 22 to allow switch 19 to open. This again increases the resistance of the rotor circuit of the motor A and causes a further decrease in speed thereof. These decreases in speed of the motor A allow the fly-wheel B to give up its energy to help said motor to drive the increased load. If the load is extremely heavy the slip will increase enough to open all three of the switches 26, 27 and 28, to cause a corresponding opening of all the switches 18, 19 and 20 and an insertion of the entire resistance 15, 16 and 17 in the rotor circuit of the motor A. When the load falls off, the resistance 15, 16 and 17 is again cut out of the rotor circuit by a process the reverse of that above described, and the motor gains speed to again store energy in the fly-wheel D.

Referring now to Fig. 2, the generator D is driven through a differential gear 39 directly from the motor A and from a synchronous motor F supplied from the mains 5, 6 and 7. The direct current winding of the motor F is supplied from the mains 24 and 25 and may be regulated by the rheostat 40. The speed of the generator D varies as the difference between the speeds of the motors F and A. The master controller C when in position $d$ completes substantially the same circuits as in Fig. 1, the direct current winding of motor F taking the place of the similar winding of motor E. Until the master controller C reaches the position $d$ the brake 36 is held down upon the brake-wheel 34 by the spring 35 and prevents the generator D from rotation. The rotation of the motor A acting through the differential gear 39 thus starts the motor F. When the controller C is moved into position $d$ and the direct current circuit of motor F is completed, said motor will be close enough to synchronous speed to fall into step. At the same time the break 36 is released and the generator D starts to rotate at a speed approximately proportional to the slip of the motor A. The operation of controlling the motor A by variations in the speed of the generator D is from this point on precisely similar to that described in connection with Fig. 1, the difference between the two figures being in the manner in which the speed of the generator D is varied in proportion to the slip of the motor A.

In the modification shown in Fig. 2 instead of driving a part of the differential gear directly from the main motor, that part of the differential gear may be driven in other ways to obtain practically the same changes of speed. Indeed the generator D may be driven in any desired manner provided its speed or its voltage is caused to vary as above described and as set forth in the claims.

The terms "inversely" or "varies inversely as" in this specification and in the claims are used broadly and are not intended to be limited to strict inverse proportion. When strict proportion is meant the terms "proportionally to" or "in proportion to" are used.

My invention is not limited to induction motors, but may be used in connection with any kind of electric motors, whether for alternating or direct current, the speed of which varies with varying load, and the number of sections of the starting and regulating resistances may be anything desired.

Many modifications in the precise arrangements here shown and described may be made without departing from the spirit and scope of my invention and all such I aim to cover in the following claims.

What I claim as new and desire to secure by Letters Patent is:—

1. In combination, an electric motor, a resistance in the armature circuit thereof, a generator, means governed by said generator for controlling said resistance, and means for causing said generator to run at a speed which varies inversely as that of the motor.

2. In combination, an electric motor, a generator, means for causing the speed of said generator to vary inversely as the speed of the motor, a resistance in the armature circuit of the motor, and means for varying said resistance in the same sense as the speed of the generator varies.

3. In combination, an electric motor, a resistance in the armature circuit thereof, means including a generator for controlling said resistance, and means for causing said generator to have a voltage which varies inversely as the speed of the motor.

4. In combination, an electric motor, a generator, means for causing the voltage of said generator to vary inversely as the speed of the motor, a resistance in the armature circuit of the motor, and means for varying said resistance in the same sense as the voltage of the generator varies.

5. In combination, an electric motor, a generator, means for causing the voltage of said generator to depend on the speed of the motor, a controlling ohmic resistance for the motor, and means for varying said resistance in approximate direct proportion to the voltage of the generator.

6. In combination, an electric motor, a generator, means for causing the speed of said generator to depend on the speed of the motor, a controlling ohmic resistance for the motor, and means for varying said resistance in approximate direct proportion to the speed of the generator.

7. In combination, a motor, controlling circuits therefor, electromagnetic switches for the controlling circuits, and means for generating a voltage which varies inversely as the speed of the motor, said electromagnetic switches being responsive to said voltage.

8. In combination, a motor, a resistance in circuit therewith, a generator, and means for causing the speed of said generator to vary inversely as the speed of the motor, and electroresponsive devices connected to the generator and controlling said resistance.

9. In combination, a motor, a resistance in circuit therewith, a generator, and means for causing the voltage of said generator to vary inversely as the speed of the motor, and electroresponsive devices connected to the generator and controlling said resistances.

10. In combination, an induction motor, a resistance in the rotor circuit thereof, means including a generator for controlling said resistance, and means for causing the voltage of said generator to be proportional to the frequency of the current in the rotor circuit of said induction motor.

11. In combination, an induction motor, a variable resistance in the secondary circuit thereof, electromagnetic means for controlling said resistance, a generator supplying current to said electromagnetic means, and means for causing the voltage of said generator to be proportional to the slip of the motor.

12. In combination, an induction motor, resistances in the secondary circuit thereof, means including a generator for controlling said resistances, and means for causing the speed of said generator to be proportional to the slip of the motor.

13. In combination, an induction motor, a variable resistance in the rotor circuit thereof, electromagnetic means for varying said resistance, a generator supplying operating current to said electromagnetic means, and means for causing the speed of said generator to be proportional to the frequency of the currents in the rotor circuit of the induction motor.

14. In combination, an induction motor, a sectional resistance in the secondary circuit thereof, a plurality of switches respectively in shunt to sections of said resistance, a corresponding plurality of solenoids controlling said switches and arranged to operate at different voltages, a generator supplying such solenoids, and means for causing the voltage of said generator to be proportional to the slip of the motor.

15. In combination, an induction motor, a sectional resistance in the rotor circuit thereof, a plurality of separate switches in shunt respectively to different sections of said resistance, a generator, means governed by said generator for controlling said switches, and means for causing the speed of said generator to be proportional to the frequency of the current in the rotor circuit of said motor.

16. In combination, a motor, a fly-wheel mechanically connected thereto, a generator, and means for causing the voltage of said generator to vary inversely as the speed of the motor, a plurality of automatic switches responsive to the voltage of said generator, and means controlled by said switches to permit a slowing down of the motor when the load on the motor exceeds the predetermined value for which that switch is set.

17. In combination, a motor, a fly-wheel mechanically connected thereto, a generator, and means for causing the speed of said generator to vary inversely as the speed of the motor, a plurality of automatic switches responsive to the voltage of said generator, and means controlled by said switches to permit a slowing down of the motor when the load on the motor exceeds the predetermined value for which that switch is set.

18. In combination, an alternating current motor, a resistance in the circuit of its secondary member, means including a generator for controlling said resistance, and means for causing the speed of said generator to be proportional to the frequency of the current in the secondary member of said motor.

19. In combination, an alternating current motor, a resistance in the circuit of its secondary member, a generator, means governed by said generator for controlling said resistance, and means for causing the voltage of said generator to be proportional to the frequency of the current in the secondary member of said motor.

20. In combination, an electric motor, a resistance in the armature circuit thereof, a converter the secondary voltage of which varies inversely as the speed of the motor, and means governed by the secondary voltage of said converter for controlling said resistance.

21. In combination, an induction motor, a resistance in the rotor circuit thereof, a converter the secondary voltage of which is proportional to the frequency of the current in the rotor circuit of said induction motor, and means governed by the secondary voltage of said converter for controlling said resistance.

22. In combination, an electric motor, a resistance in the armature circuit thereof, a converter, connections for causing the secondary voltage of the converter to vary inversely as the speed of the motor, and means governed by the secondary voltage of the converter for causing variations of said resistance in a certain relation with respect to said secondary voltage.

23. In a motor control system, a motor driving a variable load, resistance in the circuit of said motor, means for controlling said resistance, a generator energized from said motor circuit and generating energy inversely proportional to the speed of said motor, said resistance controlling means being responsive to the output of said generator to cause the speed of the motor to vary inversely as the load.

24. In combination, a motor, means associated with the circuit of said motor for regulating the speed of said motor, a generator, means for causing the output of said generator to vary inversely as the speed of said motor, and means responsive to the output of said generator for controlling said speed regulating means.

In testimony whereof I affix my signature, in the presence of two witnesses.

ROBERT B. WILLIAMSON.

Witnesses:
GEO. B. SCHLEY,
ARTHUR F. KIVIS.